United States Patent [19]
Huser

[11] 4,051,584
[45] Oct. 4, 1977

[54] CUTTING TOOL ASSEMBLY

[75] Inventor: Josef Paul Huser, Meggen, Switzerland

[73] Assignee: Firma UTILIS Mullheim A.-G., Switzerland

[21] Appl. No.: 625,712

[22] Filed: Oct. 24, 1975

[30] Foreign Application Priority Data

Oct. 24, 1975 Switzerland .................. 014284/75

[51] Int. Cl.² ............................................. B26D 1/00
[52] U.S. Cl. ................................................. 407/107
[58] Field of Search ............................ 29/95, 96, 97.5

[56] References Cited

U.S. PATENT DOCUMENTS

| 936,793 | 10/1909 | Middleton | 29/96 |
| 2,584,321 | 2/1952 | Aver | 29/97.5 |
| 3,646,649 | 3/1972 | Oaks et al. | 29/96 |
| 3,705,447 | 12/1972 | Kollar | 29/95 |
| 3,805,350 | 4/1973 | Stein | 29/95 R |
| 3,825,981 | 7/1974 | Cochran et al. | 29/96 |

FOREIGN PATENT DOCUMENTS 964,725   7/1964   United Kingdom .................. 29/96

Primary Examiner—Harrison L. Hinson
Attorney, Agent, or Firm—Craig & Antonelli

[57] ABSTRACT

A cutting tool assembly which includes a tool fixture support and a clamping strap mounted on a tool holder. The tool fixture support is provided with at least one groove or bore for receiving at least one pin element on the clamping strap whereby the lateral centering of the tool fixture support and the clamping strap is effected. The clamping strap includes a vertically extending lug portion received in a channel provided in the tool fixture support which ensures the vertical alignment of the clamping strap with respect to the tool fixture support. The tool fixture support and clamping strap are mounted on either a rigid tool holder provided with at least one longitudinally extending channel for receiving at least one connecting tongue of the tool fixture support or are mounted on a resilient tool holder. The construction of the tool fixture support and clamping strap result in a construction for enabling the use of the tool assembly as either a right hand or left hand tool.

24 Claims, 26 Drawing Figures

CUTTING TOOL ASSEMBLY

The present invention relates to a cutting tool, and more particularly to a cutting tool assembly for use on a rotating machine tool which assembly can be utilized as either a right hand or a left hand tool.

Cutting tools are generally known which include a cutting tip made of a high speed steel, hardened steel or carbide metal and such conventional tools are designed in each case as either a right hand or a left hand tool depending on their use. In general the arrangements for clamping the cutting tip of the conventional tools have a wide clamping claw or clamping strap and, for this reason, the tool holders must be clamped or tensioned laterally or in front of the machine carriage or slide. However, to effect the clamping of the cutting tip in a flawless manner and without lateral deviation, complicated centering operations must be carried out at the clamping strap with narrow tolerances since any lateral error of the clamping finger or claw increases as related to the strap length to strap width ratio. Additionally, the conventional cutting tools are useable in most cases for only one machine size.

The present invention is concerned with the task to provide a cutting tool construction which is structurally simple and suitable for universal utilization in machine tools while eliminating the aforementioned shortcomings of the prior art.

According to one feature of the present invention, a tool fixture support is provided having a groove or bore located directly at the tool cutting tip for receiving the latter and ensuring accurate precise guidance of the cutting tip.

According to another feature of the present invention, a clamping strap is provided having a pin or pin-like element or portion engaging a groove or channel provided in the tool fixture support to facilitate and ensure lateral alignment of the clamping strap with respect to the fixture support.

According to still another feature of the present invention, the clamping strap is provided with a downwardly projecting lug which is received in a further channel or groove of the tool fixture support to ensure a vertical alignment of the clamping strap with respect to the tool fixture support.

To facilitate accurate guidance and alignment of the tool fixture support at the tool holder, preferably, according to the present invention, at least one connecting tongue or projection is provided on the tool fixture support which is received in a longitudinally extending channel provided in the tool holder.

In another embodiment of the present invention, the at least one connecting tongue or projection is provided at the tool holder and is received in at least one longitudinally extending channel provided at the tool fixture support.

In a further embodiment of the present invention, a tool fixture support is provided having centering and a aligning grooves provided along portions of both longitudinal sides thereof whereby the tool fixture support is readily reversible. Additionally, preferably, two connecting tongue or projections are provided on either the tool fixture support or tool holder which are received in spaced longitudinally extending channels or grooves provided in the tool holder or tool fixture support.

To facilitate the ready adaptation of the tool assembly to a right hand or left hand tool, preferably, according to the present invention, the channels or grooves in the tool holder or tool fixture support are provided on at least two of the longitudinal sides thereof.

Furthermore, in accordance with the present invention, the clamping or engaging of the cutting tip is effected by a securing device which is located below the clamping plane of the cutting tip.

Also, in accordance with the present invention, the clamping strap and tool fixture support are structurally independent and mounted so as to be replaceable independently of each other.

Accordingly, it is an object of the present invention to provide a cutting tool assembly which avoids by simple means the aforementioned shortcomings and drawbacks encountered in the prior art.

Another object of the present invention resides in providing a cutting tool assembly which is relatively simple in construction and therefore is also relatively inexpensive.

A further object of the present invention resides in providing a cutting tool assembly which is readily useable as a right hand or left hand cutting tool.

Another object of the present invention resides in providing a cutting tool assembly which is attachable to a tool holder without any lateral projecting parts.

Still another object of the present invention resides in providing a cutting tool assembly which assures an accurate and precise guidance of the cutting tip and an accurate and precise guidance of the clamping strap with respect to the tool fixture support and the tool holder.

These and further objects, features and advantages of the present invention will become more apparent from the following description when taken in connection with the accompanying drawing which shows, for the purposes of illustration only, several embodiments in accordance with the present invention, and wherein.

Figure 1:
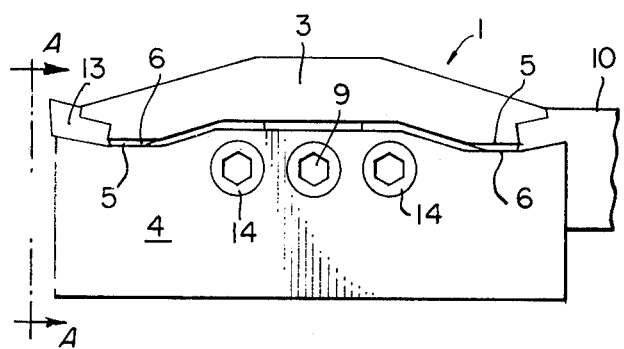
FIG. 1 is a partial side view of a tool assembly in accordance with the present invention.
Figure 11:
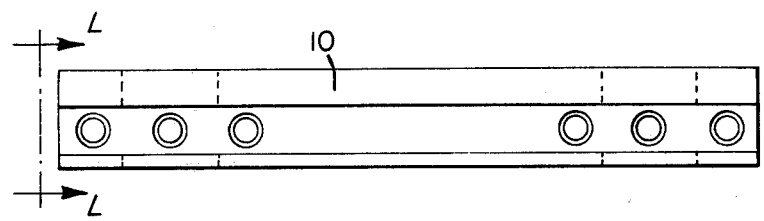
FIG. 11 is a side view of a tool holder in accordance with the present invention.
Figure 11A:
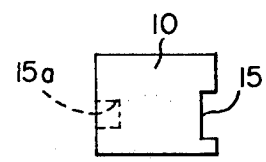
FIG. 11a is a view taken in the direction of line L—L of FIG. 11.

Referring now to the drawing wherein like reference numerals are used throughout the various views to designate like parts, and more particularly, to FIG. 1, according to this Figure, a cutting tool assembly generally designated by the reference numeral 1 includes a tool holding fixture 10, tool clamping strap 3, tool fixture support 4, and a cutting tool or tip 13. The tool holding fixture 10 is essentially of a rectangular configuration (FIGS. 11, 11a) and may be produced by a simple mechanical machining step. The height and width of the holding fixture 10 may be varied in accordance with the configuration of the cutting machine with which it is utilized since the tool fixture support and clamping strap of the present invention are independent of the specific dimensions of the tool holder 10.

The tool fixture support 4 is provided with grooves 6 along portions of at least one longitudinal side thereof. One of the grooves 6 is disposed immediately adjacent the cutting tip 13 for receiving and accurately and precisely guiding the tip.

Figure 2:
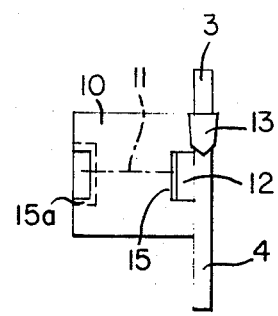
FIG. 2 is a view taken in the direction of line A—A in FIG. 1.

As shown in FIG. 2, the holding fixture 10 is provided with a longitudinally extending recess or channel 15 which receives a connecting tongue 12 provided on the tool fixture support 4. The groove 15 is disposed in the holding fixture 10 and extends equally on both sides of a horizontally extending plane 11 thereby assuring accurate alignment of the tool fixture support 4 and the cutting tip 13. To facilitate the mounting of the tool fixture support 4 so as to be readily adaptable for a right hand or left hand mode of operation, an additional recess or channel 15a may be provided in the tool holding fixture 10.

Figure 3:
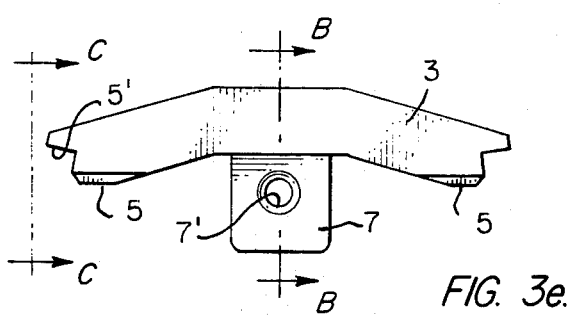
FIG. 3 is a side view of the attachment or clamping strap of the tool assembly of FIG. 1.
Figure 3A:
FIG. 3a is a view taken in the direction of line C—C in FIG. 3.
Figures 3B, 3C:
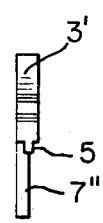
FIG. 3b is a cross-sectional view taken along the line B—B of FIG. 3.
FIG. 3c is a view similar to FIG. 3a of a modified clamping or attachment strap in accordance with the present invention.

As shown in FIG. 3, the tool clamping strap 3 is provided with downwardly extending lugs or pins 5, a stepped portion 5', and a downwardly projecting lug 7 having a bolt receiving bore or aperture 7'. When assembled the lug 5 is received in the grooves 6 and the stepped portion 5' engages a stepped portion of the cutting tip 13. As shown in FIGS. 3a and 3b, the lug 7 may be offset with respect to the lug 5; however it is also possible in accordance with the present invention to provide a tool clamping strap 3' having a lug 7" which is disposed substantially in the same plane as the lug 5 as shown in FIGS. 3c and 3d.

Figure 3E:
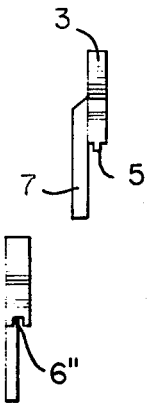
FIG. 3e is an alternate embodiment of the attachment or clamping straps.
Figures 3D, 4:
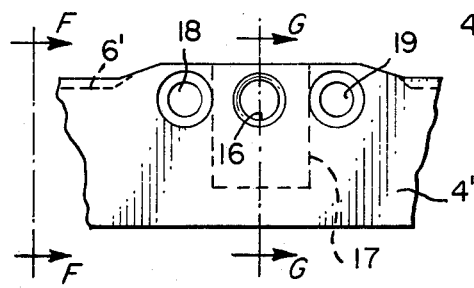
FIG. 3d is a view similar to FIG. 3b of the clamping or attachment strap of FIG. 3c.
FIG. 4 is a side view of the tool fixture support or attachment of the tool assembly of FIG. 1.
Figure 4A:
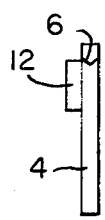
FIG. 4a is a view taken in the direction of line E—E of FIG. 4.
Figure 4B:
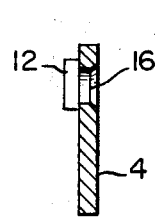
FIG. 4b is a cross-sectional view taken along the line D—D of FIG. 4.

As shown in FIGS. 4–4b, the grooves 6 are provided along portions of the tool fixture support 4 and have a substantially V-shaped cross-sectional configuration with a bore or aperture 16 being provided substantially centrally of the tool fixture support 4 for receiving a mounting bolt 9. Two additional bores 18, 19 are provided and disposed on respective sides of the bore 16 for receiving mounting bolts 14.

Figure 5C:
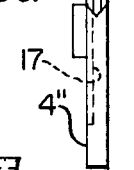
FIG. 5c is an alternate embodiment of a tool fixture support or attachment.
Figures 5, 5A:
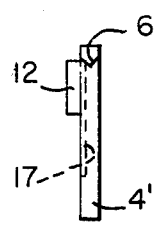
FIG. 5 is a partial side view of a modified tool fixture support or attachment in accordance with the present invention.
FIG. 5a is a view taken in the direction of line F—F of FIG. 5.
Figure 5B:
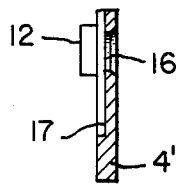
FIG. 5b is a cross-sectional view taken along line G—G of FIG. 5.

According to FIG. 5, a tool fixture support 4' is provided which includes a suitable recess or channel 17 provided in one surface thereof for receiving the lug 7 or 7" of the clamping strap 3 or 3' to facilitate the alignment of the tool fixture support 4 and the clamping strap 3 or 3'. In an alternate embodiment, as shown in FIGS. 3e and 5c, the clamping strap 3" is provided with grooves 6", while the tool fixture 4" is provided with upwardly extending lugs or pins 5".

Figure 6:
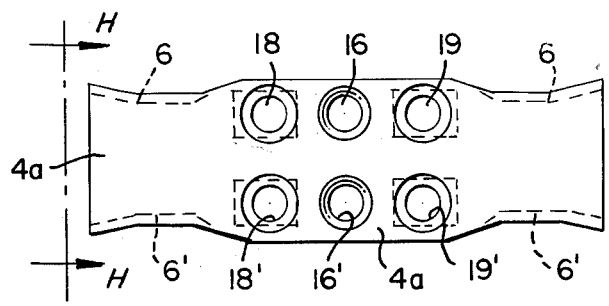
FIG. 6 is a side view of a reversible tool fixture support or attachment in accordance with the present invention.
Figure 6A:
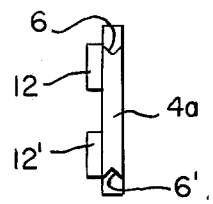
FIG. 6a is a view taken in the direction of line H—H of FIG. 6.

As readily apparent from FIG. 1, the tool clamping strap 3 is disposed on the tool fixture 10 with the lugs 5 being disposed in the respective grooves 6 of the tool fixture support 4. The cutting tip 13 is disposed between the stepped portion 5' and the clamping strip 3 and the tool fixture support 4. The clamping or mounting bolt 9 is inserted through the bores 16 and 7' and clamping bolts 14 are inserted through the bores 18, 19 whereby the cutting tool is assembled and mounted on the tool holder 10. By virtue of the above-described construction, the connection of the tool fixture support 4 to the clamping strip 3 serves simultaneously to center the cutting tip 13 with the centering of the tool fixture support and the clamping strap 3 being accomplished by the lugs 5 and grooves 6. According to FIG. 6, a reversible tool fixture support 4a is provided which includes centering and aligning grooves 6, 6', bolt receiving mounting bores 16, 18, 19 and 16', 18', 19'. As shown in FIG. 6a, the grooves 6, 6' have a substantially V-shaped configuration and two connecting tongues 12, 12' are provided on one surface of the tool fixture support 4a.

Figure 12:
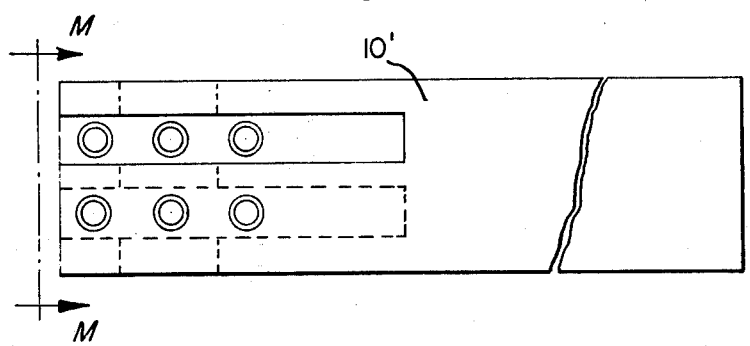
FIG. 12 is a modified tool holder in accordance with the present invention.
Figure 12A:
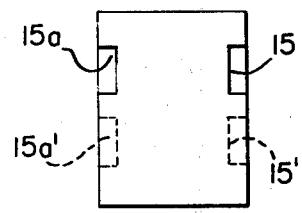
FIG. 12a is a view taken in the direction of line M—M of FIG. 12.

The tool fixture support 4a may be mounted on a holding fixture 10' as shown in FIG. 12 which fixture includes channels or recesses 15, 15', 15a, 15a' for receiving the connecting tongues 12, 12' in dependence upon which side the tool fixture support 4a is mounted to the holding fixture 10'.

Figure 7:
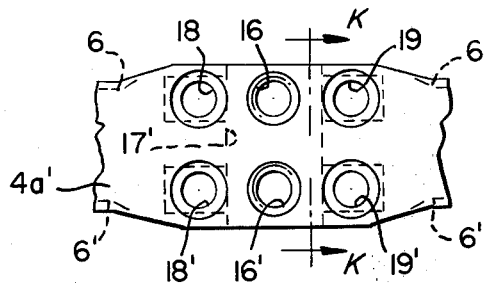
FIG. 7 is a partial side view of a modified reversible tool fixture support or attachment in accordance with the present invention.
Figure 7A:
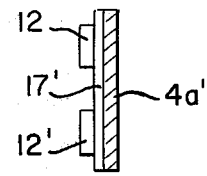
FIG. 7a is a cross-sectional view taken along the line K—K of FIG. 7.

According to FIGS. 7 and 7a a reversible tool fixture support 4a' is provided which includes a channel or groove 17' for receiving the lugs 7 or 7" of the clamping strap 3 or 3' to facilitate alignment of the tool fixture support 4a' and the clamping strap 3 or 3'.

Figure 8:
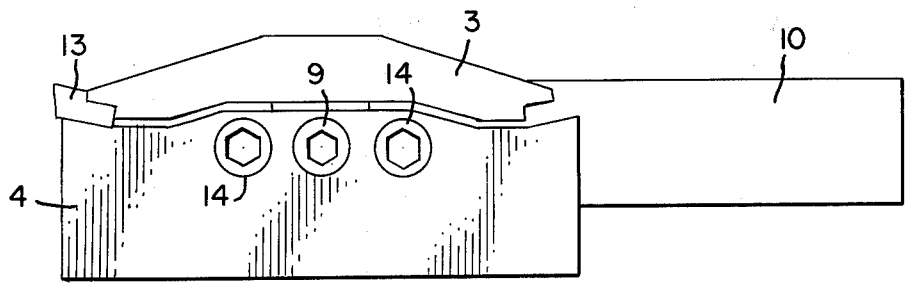
FIG. 8 is a complete side view of the tool assembly of FIG. 1 in the form of a right hand tool.
Figure 9:
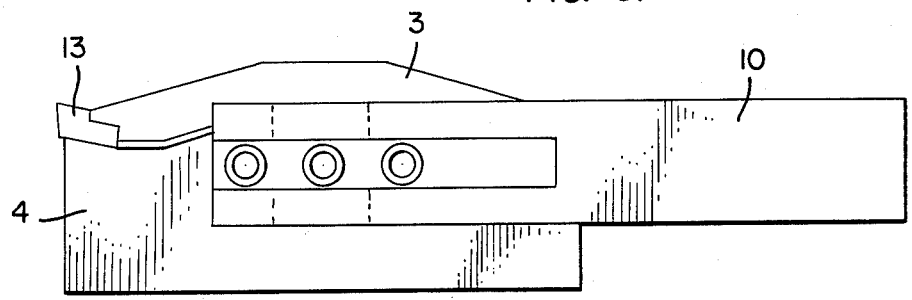
FIG. 9 is a complete side view of the tool assembly of FIG. 1 in the form of a left hand tool.

According to FIG. 8, the tool fixture support 4, clamping strap 3 and cutting tip 13 are mounted to the tool holding fixture 10 so that a right hand tool assembly results; whereas, in FIG. 9, a left hand tool assembly results by mounting the tool fixture support 4, clamping strap 3, and cutting tip 13 on the opposite side or surface of the tool holding fixture 10.

Figure 10:
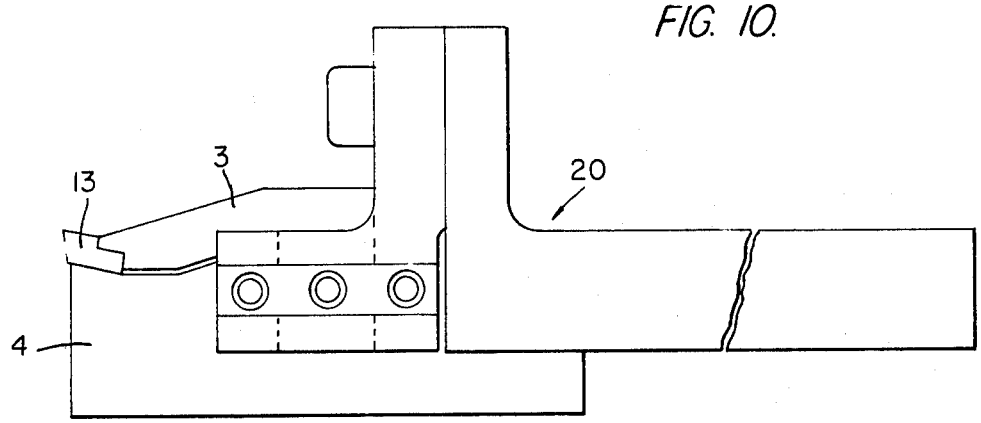
FIG. 10 is a side view of the tool fixture support and clamping strap of the present invention mounted on a resilient tool holder.

As shown in FIG. 10, a resilient tool holder generally designated by the reference numeral 20 may be provided having the tool fixture support 4, clamping strap 3 and cutting tip 13 mounted thereon. While FIG. 10 illustrates a left hand tool arrangement, it is understood that the support 4, strap 3 and cutting tip 13 may be mounted on the opposite surface or side of the tool holder 20 thereby resulting in a right hand tool arrangement.

Furthermore, the clamping strap 3 is to be understood as a resilient element such as a blade- or spring-like element being rigid in the lateral plane and resilient in the vertical direction, by the lugs 5 and the grooves 6 guiding the clamping strap 3 laterally and simultaneously clamping the cutting tip 13 when the downwardly projecting lug 7 is fixed by mounting bolt 9 against the tool fixture support 4, thereby pressing lug 7 downwardly by a cone-shaped head (not shown in the figures) of bolt 9.

Additionally, it is also understood that the longitudinally extending recess or channel may be provided in the tool fixture support and the connecting tongue may be provided in the tool holder with the same guidance and alignment of the tool fixture support and tool holder being readily realized.

In each of the above-described embodiments, preferably, the clamping of the cutting tip 13 is effected by the mounting bolt 9 with the engagement point of the mounting bolt being disposed below the clamping plane of the cutting tip 13.

Furthermore, while the clamping strap 3, 3' and tool fixture support 4, 4', 4a, 4a' have been described as being independent single units, it is readily understood that the respective elements may be designed as a dual or quadruple type individual unit.

While I have shown and described several embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A cutting assembly comprising: a cutting tool means, a tool holder means, a support means for supporting said cutting tool means, clamping means for clamping said cutting tool means on said support means, said support means and said clamping means being provided with two opposed longitudinally extending surfaces, means provided on the opposed surfaces of said support means and said clamping means for receiving and accurately guiding said cutting tool means, guide means projecting outwardly from one of the opposed surfaces of said clamping means and said support means for laterally aligning said clamping means relative to said support means, groove means provided on the other of the opposed surfaces of said clamping means and said support means for receiving said guide means, means provided on one of the opposed surfaces of said support means and said clamping means for vertically aligning said clamping means relative to said support means, said guide means, said groove means and said means for vertically aligning said clamping means being arranged on said opposed surfaces substantially along a vertically extending center plane of said clamping means and said support means, and means for mounting said support means and said clamping means on said tool holder means.

2. A cutting assembly comprising: a cutting tool means, a tool holder means, a support means for supporting said cutting tool means including a tool fixture support, clamping means for clamping said cutting tool means on said tool fixture support including a clamping strap, means provided on said tool fixture support and said clamping strap for receiving and accurately guiding said cutting tool means, means for laterally aligning said clamping strap relative to said tool fixture support including at least one guide member provided along a surface of said clamping strap facing said tool fixture support, at least one guide groove means provided on said tool fixture support for receiving and guiding said at least one guide member, means formed along the surface of the clamping strap facing said tool fixture support for vertically aligning said clamping strap relative to said tool fixture support, means provided at the tool fixture support for accommodating said vertical aligning means and means for mounting said tool fixture support and said clamping strap on said tool holder means.

3. An assembly according to claim 2, wherein said means for vertically aligning includes a guide element provided on said clamping strap at a position longitudinally spaced from said at least one guide member and laterally offset with respect thereto.

4. A cutting assembly comprising: a cutting tool means, a tool holder means, a support means for supporting said cutting tool means including a tool fixture support, clamping means for clamping said cutting tool means on said tool fixture support including a clamping strap, means provided on said tool fixture support and said clamping strap for receiving and accurately guiding said cutting tool means, means for laterally aligning said clamping strap relative to said tool fixture support including at least two guide members disposed along the surface of said clamping strap facing said tool fixture support and two guide groove means provided on said tool fixture support for receiving a respective guide member, and wherein a means for vertically aligning said clamping strap relative to said tool fixture support is provided including at least one guide element disposed on said clamping strap substantially centrally of and laterally off-set with respect to said two guide members, and wherein a means is provided for mounting said tool fixture support and said clamping means on said tool holder means.

5. An assembly according to claim 4, wherein said means for mounting said support means and said clamping means on said tool holder means includes at least one longitudinally extending groove means provided in one of said tool fixture support and said tool holder means, and at least one longitudinally extending projection means provided on the other of said tool fixture support and said tool holder means, said projection means being received in said at least one groove means for aligning said tool fixture support relative to said tool holder means.

6. An assembly according to claim 5, wherein said mounting means further includes at least one bolt means for clamping said cutting tool means to said tool holder means.

7. An assembly according to claim 6, wherein an engagement point of said bolt means with said tool holder means is disposed below a clamping plane of said cutting tool means.

8. An assembly according to claim 7, wherein said means for vertically aligning further includes a channel means provided in at least one surface of said tool fixture support for receiving and guiding said guide element provided on said clamping strap.

9. An assembly according to claim 8, wherein said tool holder means is a rigid component.

10. An assembly according to claim 8, wherein tool holder means is a resilient component.

11. A cutting assembly comprising: a cutting tool means, a tool holder means, a support means for supporting said cutting tool means including a tool fixture support, clamping means for clamping said cutting tool means on said tool fixture support including a clamping strap, means provided on said tool fixture support and said clamping strap for receiving and accurately guiding said cutting tool means, means for laterally aligning said clamping strap relative to said tool fixture support including at least one guide member provided along a surface of said clamping strap facing said tool fixture support, and at least one guide groove means provided on said tool fixture support for receiving and guiding said at least one guide member, means for vertically aligning said clamping strap relative to said tool fixture support including at least one guide element provided on said clamping strap longitudinally spaced from said at least one guide member and disposed substantially co-planar therewith.

12. An assembly according to claim 11, wherein at least two guide members are provided and disposed along the lower surface of said clamping strap, said tool fixture support being provided with two guide groove means each of which receives a respective guide member, said guide element being disposed on said clamping strap substantially centrally of said two guide members.

13. An assembly according to claim 12, wherein said means for mounting said support means and said clamping means on said tool holder means includes at least one longitudinally extending groove means provided in one of said tool fixture support and said tool holder means, and at least one longitudinally extending projection means provided on the other of said tool fixture support and said tool holder means, said projection means being received in said at least one groove means for aligning said tool fixture support relative to said tool holder means.

14. An assembly according to claim 13, wherein said mounting means further includes at least one bolt means for clamping said cutting tool means to said tool holder means.

15. An assembly according to claim 14, wherein an engagement point of said bolt means with said tool holder means is disposed below a clamping plane of said cutting tool means.

16. An assembly according to claim 15, wherein said means for vertically aligning further includes a channel means provided in at least one surface of said tool fixture support for receiving and guiding said guide element provided on said clamping strap.

17. A cutting assembly comprising: a cutting tool means, a tool holder, a support means for supporting said cutting tool means including a tool fixture support, clamping means for clamping said cutting tool means on said support means including a clamping strap, means provided on said tool fixture support and said clamping strap for receiving and accurately guiding said cutting tool means, means for laterally aligning said clamping strap relative to said tool fixture support including at least one guide member provided along a surface of said clamping strap facing said tool fixture support, at least one guide groove means provided along a first surface of said tool fixture support for receiving and guiding said at least one guide member, and at least one further guide groove means provided along a second surface of said tool fixture support for receiving and guiding said at least one guide member, said second surface being disposed in spaced parallel relationship to said first surface whereby said tool fixture support is reversibly mountable on said tool holder means, means for vertically aligning said clamping strap relative to said tool fixture support, and means for mounting said tool fixture support and said clamping strap on said tool holder means.

18. An assembly according to claim 17, wherein at least two guide members are provided and disposed on said clamping strap along the surface thereof facing the tool fixture support, said tool fixture support being provided with two guide groove means along said first surface thereof for respectively receiving said two guide members, said tool fixture support also being provided with two further guide groove means along said second surface thereof for respectively receiving said two guide members.

19. An assembly according to claim 18, wherein said means for vertically aligning includes a guide element on said clamping strap longitudinally spaced from said at least two guide members and laterally offset with respect thereto.

20. An assembly according to claim 19, wherein said means for vertically aligning further includes a channel means provided in at least one surface of said tool fixture support for receiving and guiding said guide element provided on said clamping strap.

21. An assembly according to claim 20, wherein said means for mounting said support means and said clamping means on said tool holder means includes at least one longitudinally extending groove means provided in one of said tool fixture support and said tool holder means, and at least one longitudinally extending projection means provided on the other of said tool fixture support and said tool holder means, said projection means being received in said at least one groove means for aligning said tool fixture support relative to said tool holder means.

22. An assembly according to claim 1, wherein said clamping means is resilient in the vertical direction.

23. A cutting assembly comprising: a cutting tool means, a tool holder means, a support means for supporting said cutting tool means, clamping means for clamping said cutting tool means on said support means, means provided on said support means and said clamping means for receiving and accurately guiding said cutting tool means, means for laterally aligning said clamping means relative to said support means including at least two spaced guide means provided on one of said clamping means and said support means, and at least two guide groove means provided on the other of said supporting means and clamping means for respectively receiving said two guide means, said clamping means being resilient in the vertical direction, means for vertically aligning said clamping means relative to said support means, and means for mounting said support means and said clamping means on said tool holder means.

24. A cutting assembly comprising: a cutting tool means, a tool holder means, a support means for supporting said cutting tool means, clamping means for clamping said cutting tool means on said support means, means provided on said support means and said clamping means for receiving and accurately guiding said cutting tool means, means provided on said clamping means and said support means for laterally aligning said clamping means relative to said support means, means formed along a surface of the clamping means facing the support means for vertically aligning said clamping means relative to said support means, means provided at the support means for accommodating said vertical aligning means, and means for mounting said support means and said clamping means on said tool holder means including at least one longitudinally extending groove means provided on one of said support means and said tool holder means, and at least one longitudinally extending projection means provided on the other of said support means and said tool holder means, said projection means being received in said at least one groove means for aligning said support means relative to said tool holder means.

* * * * *